United States Patent Office 2,945,910
Patented July 19, 1960

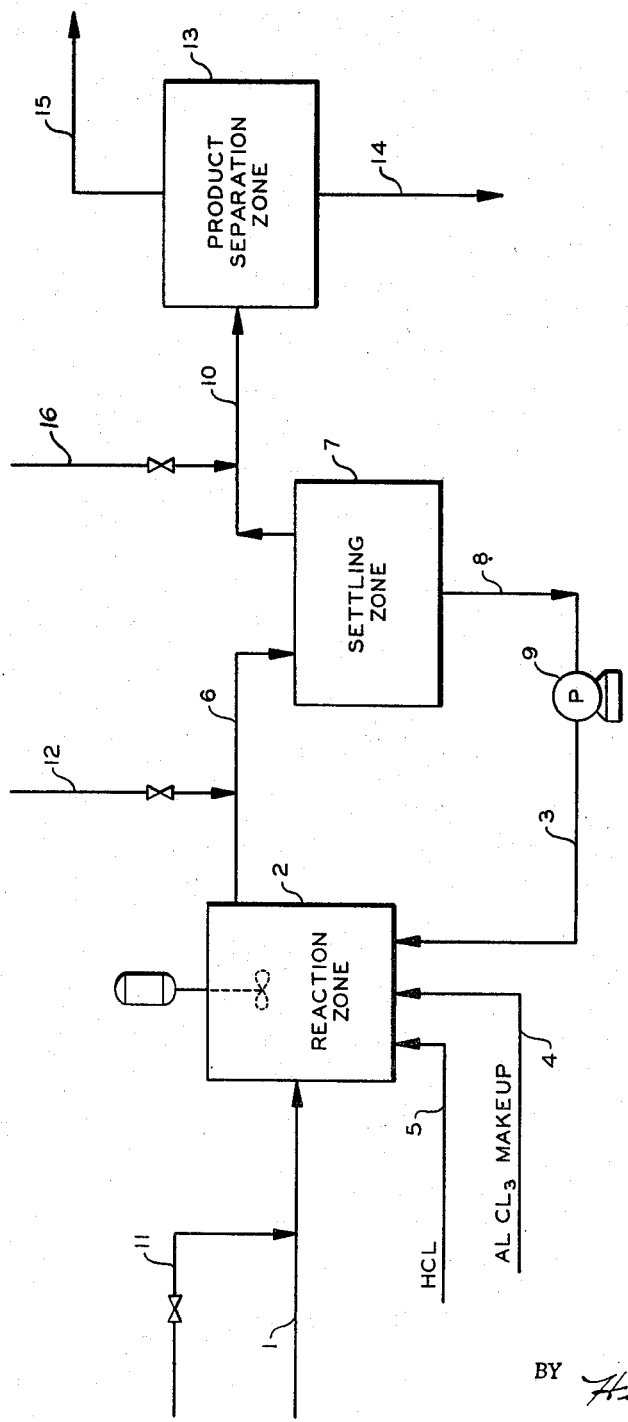

2,945,910

ALUMINUM CHLORIDE-HYDROCARBON COMPLEX SLUDGE CATALYST SEPARATION

Ivan A. Peterson, Bartlesville, Okla., assignor to Phillips Petroleum Company, a corporation of Delaware Filed June 9, 1958, Ser. No. 740,759

5 Claims. (Cl. 260—683.74)

This invention relates to a method for obtaining improved separation of aluminum chloride-hydrocarbon complex sludge catalyst. In a more specific aspect the invention involves the addition of a finely divided weighting material to a mixture of fluid hydrocarbons and an aluminum chloride-hydrocarbon complex sludge catalyst to facilitate separation of the catalyst from the fluid hydrocarbon.

In hydrocarbon conversion processes employing an aluminum chloride-hydrocarbon complex sludge catalyst the reactor effluent is passed to a settling zone for settling the relatively heavy catalyst sludge from the liquid hydrocarbon product. The nature of the catalyst sludge is such that there is not a desirably clear line of demarcation between the catalyst phase and the liquid hydrocarbon product phase even with a considerably long time of settling. This causes numerous difficulties in that the aluminum chloride sludge catalyst must be separated from the product phase in later processing steps; otherwise, numerous difficulties such as corrosion, etc., are encountered in downstream process equipment such as fractionators, heat exchangers, etc. Also, part of the product is entrained in the lower catalyst sludge phase and is recycled to the reactor with the catalyst which is recycled thereto; this is undesirable in that the reactor capacity is lowered by reason of the recycle of product hydrocarbon; further, the catalyst sludge, containing appreciable amounts of product hydrocarbon, is undesirably diluted, and this dilution lowers the effectiveness of the catalyst in the reaction step. Accordingly, it is an object of the present invention to provide a method for obtaining a more complete physical separation of an aluminum chloride-hydrocarbon complex sludge catalyst from a mixture containing same and containing fluid hydrocarbons.

Other objects, as well as aspects and advantages of the invention will become apparent from a consideration of the accompanying disclosure and the drawing.

According to the invention there is provided a process which comprises admixing an inert, finely divided weighting material to an aluminum chloride-hydrocarbon complex sludge catalyst which is in admixture with a fluid hydrocarbon, thereby promoting agglomeration of the sludge catalyst so that it is more easily separable from the fluid hydrocarbons by physical methods.

The invention will be better understood by reference to the accompanying drawing, which is a schematic diagram illustrating several methods by which the invention can be effected.

Referring to the drawing, line 1 is for the introduction of hydrocarbons to be converted into reaction zone 2, which usually contains a stirring means, such as the rotary agitator illustrated. Also introduced into reaction zone 2 through line 3 is recycle aluminum chloride-hydrocarbon complex sludge catalyst; make-up aluminum chloride is introduced through line 4, as needed, although make-up aluminum chloride can be introduced with feed hydrocarbon or into any other suitable point in the system. If needed, there is also introduced hydrogen chloride through line 5. Total effluent from the reaction zone flows through line 6 to settling zone 7. This effluent contains the converted hydrocarbons as well as the feed hydrocarbons which did not undergo reaction and also contains in admixture the aluminum chloride-hydrocarbon complex sludge catalyst. In settling zone 7 the fluid hydrocarbon and the sludge catalyst phases separate into two layers, and the catalyst phase is withdrawn through line 8 by pumping means 9 to line 3. Hydrocarbon phase is withdrawn from the settling zone through line 10. According to one method of the invention a finely divided weighting material is introduced either through line 11 or line 12 into line 1 or line 6, respectively. The weighting material can be introduced as a dry powder, but is preferably introduced as a slurry in a fluid hydrocarbon. Any hydrocarbon is suitable which will not interfere with the product or is easily separable from the product. A very convenient method is to introduce the weighting material through line 11 in the form of a slurry in a portion of the same feed hydrocarbon which is introduced through line 1. Similarly, weighting material introduced through line 12 into line 6 can be slurried in a portion of the reactor effluent in line 6 or in a portion of the hydrocarbon effluent in line 10. The amount of the weighting agent employed according to the invention will vary considerably depending upon the weighting agent used and its specific gravity, but usually from 0.3 to 10 weight percent of the sludge catalyst will be employed, although higher or lower amounts can be used. In any case the weighting agent causes agglomeration of the sludge catalyst in the settling zone so that nearly complete separation is obtained therein. The sludge catalyst containing the weighting agent is recycled through line 8, pumping means 9 and line 3 to the reaction zone. Thereafter, no additional weighting agent need be added except periodically to make up for any small losses encountered. The effluent taken through line 10 is usually treated in a final product separation zone to remove any small traces of sludge catalyst and weighting agent. Such a separation zone can be another settler, a liquid cyclone separator, a filter, or a zone wherein the product is percolated through a bed of bauxite to filter out the contaminating materials. Any other suitable separation means can, of course, be employed. Alternately, or in addition to the introduction of the weighting material in line 11 or line 12, weighting material can be introduced into line 10 via line 16. This method does not improve the condition of the sludge catalyst in line 3 and is therefore usually employed in conjunction with additional weighting material to line 11 or line 12. However, the addition of the weighting material to line 10 facilitates the agglomeration of small amounts of sludge catalyst in that line so that subsequent separation in product separation zone 13 is more efficiently effected. Lines 14 and 15 are, respectively, for the removal of separated sludge catalyst and weighting agent (line 14) and the removal of the product hydrocarbon (line 15) to further processing.

In a specific example of the invention the reaction effected in reaction zone 2 is the isomerization of n-hexane. In this example the feed in line 1 is 416,200 gallons per day of a hexane concentrate containing 63.1 percent n-hexane, 18.2 percent methylcyclopentane, 3.8 percent cyclohexane, 14.7 percent isohexane, and 0.2 percent isoheptane, all percents by volume. The aluminum chloride-hydrocarbon complex sludge catalyst circulated in line 3 is about 300,000 gallons per day and contains about 36 percent by weight of aluminum chloride in the complex. There is added 19,700 gallons per day of hydrogen chloride through line 5. The reactor effluent in line 6 has the following composition:

| | Vol. percent |
|---|---|
| n-Hexane | 16.1 |
| Methylcyclopentane | 2.3 |
| Cyclohexane | 9.6 |
| Isohexanes | 28.0 |
| Catalyst | 40.9 |
| HCl | 2.7 |
| Isoheptanes | 0.1 |
| 1-1,dimethylcyclopentane(+) | 0.3 |

There is added to the system in this example enough finely divided barium sulfate through line 12 into line 6 so that about 40,000 pounds per day of barium sulfate are circulated through line 3 with the 300,000 gallons per day of catalyst circulated therethrough. This addition is, of course, not made on a continuous basis, and only enough barium sulfate is added after the initial addition in order to make up any losses. After the addition of the barium sulfate the reactor effluent then contains, in addition to the components set forth in the foregoing table, 40,000 pounds per day of barium sulfate. From settling zone 7 the hydrocarbon components are withdrawn to product separation zone 13 to remove the last traces of aluminum chloride sludge and barium sulfate. In the case of this specific example the removal is accomplished by passing the fluid mixture through a bed of bauxite until all of the contaminating materials have been picked up. The product is then sent to further separation and purification through line 15.

In addition to finely divided barium sulfate, other examples of inert weighting materials which can be employed in the invention are aluminum oxide, calcium sulfate, barium chloride, lead sulfate, and magnesium sulfate. Preferably, the inert weighting materials employed in the invention have a specific gravity of at least 2.5.

While the invention has been described in connection with a specific example of the isomerization of normal hexane, it is applicable to any hydrocarbon conversion process effluent wherein an aluminum chloride-hydrocarbon complex sludge catalyst is employed. Thus, the invention is applicable, for instance, to the isomerization of other normal paraffins to isoparaffins, as well as to the isomerization of methylcyclopentane to cyclohexane, etc. The invention is also applicable to the alkylation using such a sludge catalyst of isobutane with ethylene to produce diisopropyl.

In the following test runs which were devised to measure the effect of adding the weighting agent on the sharpness of the clarification of a sample of aluminum chloride-hydrocarbon complex sludge catalyst in admixture with fluid hydrocarbons in the gasoline range, the samples of catalyst diluted with a fluid hydrocarbon were contacted by hand shaking for one minute in a 250 ml. Erlenmyer flask. The test runs had the amount of barium sulfate shown in the tables while comparative runs were made containing no barium sulfate. The mixtures after shaking were then poured into 25 ml. graduated cylinders and allowed to stand.

| | Run 1 | Run 2 |
|---|---|---|
| DIP Aluminum Chloride Catalyst____ml__ | 20 | 20 |
| C₈ isoparaffin_____ml__ | 75 | 75 |
| Barium Sulphate_____gr__ | .2 | none |

1 Minute—Sample (Run 1) and Blank (Run 2) both straw color.
5 Minutes—Light crystals in both samples. Crystals approximately 2 to 5 times larger in treated sample.
10 Minutes—Sample treated with BaSO₄ much clearer.

| | Run 3 | Run 4 |
|---|---|---|
| Hexane Unit Aluminum Chloride Catalyst____ml__ | 20 | 20 |
| Hexane Unit Feed_____ml__ | 75 | 75 |
| Barium Sulphate_____gr__ | 0.26 | none |

1 Minute—Sample (Run 3) and Blank (Run 4) both straw color.
5 Minutes—Much larger flock in sample containing BaSO₄.

The DIP aluminum chloride catalyst employed in runs 1 and 2 was equilibrium catalyst from a commercial unit producing diisopropyl by the alkylation of isobutane with ethylene. The hexane unit aluminum chloride catalyst is aluminum chloride-hydrocarbon complex from a commercial unit for the isomerization of n-hexane.

Run 1, compared with run 2, showed that the barium sulfate formed larger crystals and helped to clear the aluminum chloride-hydrocarbon sludge catalyst out of the isooctane. Similarly run 3, compared with run 4, showed that the barium sulfate will cause the catalyst to settle out better.

As will be evident to those skilled in the art, various modifications of this invention can be made or followed in the light of the foregoing disclosure and discussion without departing from the spirit or scope of the disclosure or from the scope of the claims.

I claim:

1. In the recovery of an aluminum chloride-hydrocarbon complex sludge catalyst by gravity separation from its admixture with liquid hydrocarbons contained in the effluent from a reaction zone for the isomerization of n-hexane to isohexanes and wherein the sludge is recycled to the reaction zone, the step of agglomerating said sludge catalyst by admixing therewith a finely divided barium sulfate.

2. In a process for effecting a catalytic isomerization of normal hexane employing an aluminum chloride-hydrocarbon complex sludge catalyst which comprises maintaining a zone of reaction and a settling zone, continuously passing a body of catalyst into said reaction zone, continuously passing normal hexane to be isomerized to said reaction zone wherein it is isomerized in contact with said catalyst, passing the resulting conversion mixture together with said catalyst to said settling zone to provide separation by gravity of a fluid hydrocarbon phase containing the isomerized normal hexane from said catalyst, passing said hydrocarbon phase from the upper region of said settling zone to further processing, and passing said catalyst back to said reaction zone; the improvement which comprises maintaining in said circulating body of catalyst from 0.3 to 10 weight percent of barium sulfate based on the weight of said catalyst.

3. In the recovery of an aluminum chloride-hydrocarbon complex sludge catalyst from its admixture with liquid hydrocarbons in the effluent from a reaction zone, the process of agglomerating said sludge catalyst by admixing therewith a finely divided solid inorganic weighting agent selected from the group consisting of aluminum oxide, calcium sulfate, barium chloride, lead sulfate, magnesium sulfate, and barium sulfate, passing said admixture into a settling zone wherein said agglomerated sludge catalyst together with said weighting agent settles in a separate phase from the hydrocarbons, removing said sludge and said weighting agent from the lower region of the settling zone, and removing said hydrocarbons from the upper region of the settling zone.

4. In a process for effecting a catalytic conversion of a hydrocarbon employing an aluminum chloride-hydrocarbon complex sludge catalyst which comprises maintaining a zone of reaction and a settling zone, passing a body of catalyst into said reaction zone, passing a hydrocarbon stream to be converted to said reaction zone wherein it is converted in contact with said catalyst, passing the resulting conversion mixture together with said catalyst to said settling zone to provide separation by gravity of a fluid hydrocarbon phase containing conversion products from said catalyst, passing said hydrocarbon phase from the upper region of said settling zone to further processing, and passing said catalyst back to said reaction zone; the improvement which comprises maintaining in the circulating body of catalyst a finely divided inorganic weighting agent selected from the group consisting of aluminum oxide, calcium sulfate, barium chloride, lead sulfate, magnesium sulfate, and barium sulfate, said weighting agent having a specific gravity of at least 2.5 and being chemically inert to the reaction and settling process.

5. In a process for effecting a catalytic conversion of a hydrocarbon employing an aluminum chloride-hydrocarbon complex sludge catalyst which comprises maintaining a zone of reaction and a settling zone, passing a body of catalyst to said reaction zone, passing a hydrocarbon stream to be converted to said reaction zone wherein it is converted in contact with said catalyst, passing the resulting conversion mixture together with said catalyst to said settling zone to provide separation by gravity of a fluid hydrocarbon phase containing conversion products from said catalyst, passing said hydrocarbon phase from the upper region of said settling zone to further processing, and passing said catalyst back to said reaction zone; the improvement which comprises maintaining in a circulating body of catalyst finely divided barium sulfate, said barium sulfate having a specific gravity of at least 2.5 and being chemically inert to the reaction and settling process.

References Cited in the file of this patent

UNITED STATES PATENTS

| | | |
|---|---|---|
| 1,889,932 | Pongratz | Dec. 6, 1932 |
| 2,228,527 | Meyer | Jan. 14, 1941 |
| 2,266,012 | D'Ouville et al. | Dec. 16, 1941 |
| 2,328,707 | Clar et al. | Sept. 7, 1943 |
| 2,341,567 | Moriarty | Feb. 15, 1944 |
| 2,375,460 | Barbre | May 8, 1945 |
| 2,398,495 | D'Ouville et al. | Apr. 16, 1946 |
| 2,421,524 | Ross et al. | June 3, 1947 |

FOREIGN PATENTS

| | | |
|---|---|---|
| 107,239 | Australia | May 4, 1939 |